(12) United States Patent
Yeo et al.

(10) Patent No.: US 10,239,015 B2
(45) Date of Patent: Mar. 26, 2019

(54) APPARATUS AND METHOD FOR SEPARATING CARBON DIOXIDE WITH SELF RECYCLE LOOP

(71) Applicant: KOREA INSTITUTE OF ENERGY RESEARCH, Daejeon (KR)

(72) Inventors: Jeong-gu Yeo, Daejeon (KR); Jung-hyun Lee, Daejeon (KR); Jong-ho Moon, Daejeon (KR); Young Cheol Park, Daejeon (KR); Dahun Lee, Daejeon (KR); Woong Jin Oh, Daejeon (KR)

(73) Assignee: KOREA INSTITUTE OF ENERGY RESEARCH, Daejeon (KR)

( * ) Notice: Subject to any disclaimer, the term of this patent is extended or adjusted under 35 U.S.C. 154(b) by 1 day.

(21) Appl. No.: 15/358,771

(22) Filed: Nov. 22, 2016

(65) Prior Publication Data

US 2018/0140994 A1    May 24, 2018

(51) Int. Cl.
*B01D 53/22* (2006.01)
*C01B 32/50* (2017.01)

(52) U.S. Cl.
CPC ............ *B01D 53/226* (2013.01); *C01B 32/50* (2017.08); *B01D 2257/504* (2013.01); *B01D 2258/0283* (2013.01); *Y02C 10/10* (2013.01)

(58) Field of Classification Search
CPC .... B01D 53/62; B01D 53/225; B01D 53/226; B01D 53/22; B01D 2311/25; Y02C 10/10
See application file for complete search history.

(56) References Cited

U.S. PATENT DOCUMENTS

| | | | | |
|---|---|---|---|---|
| 4,264,338 A | * | 4/1981 | Null | B01D 53/226 95/47 |
| 5,082,471 A | * | 1/1992 | Athayde | B01D 53/229 128/205.11 |
| 5,273,572 A | * | 12/1993 | Baker | B01D 5/0057 95/254 |

(Continued)

FOREIGN PATENT DOCUMENTS

KR    10-1414491 B1    7/2014

OTHER PUBLICATIONS

Perry "Perrys-Chemical-Engineers-handbook" 7th ed., McGraw-Hill 1999 p. 22-38.*

*Primary Examiner* — Anthony R Shumate
(74) *Attorney, Agent, or Firm* — Sughrue Mion, PLLC

(57) ABSTRACT

This invention relates to a device for separating carbon dioxide that includes a self-recycling loop, and to a method of separating carbon dioxide, which serve to effectively separate carbon dioxide from a combustion gas using a separation membrane provided with the self-recycling loop. This invention adopts a self-recycling loop in which the residue gas passing through a specific separation membrane is introduced into another separation membrane and in which a permeate gas passing through the specific separation membrane is introduced back into the specific separation membrane. Accordingly, the concentration of carbon dioxide in the feed gas of the specific separation membrane is increased, which increases the concentration of the permeate gas to thus improve the separation performance of the separation membrane, thereby separating high-purity carbon dioxide.

8 Claims, 5 Drawing Sheets

(56) References Cited

U.S. PATENT DOCUMENTS

| | | | | |
|---|---|---|---|---|
| 5,281,253 A * | 1/1994 | Thompson | B01D 53/226 | 95/22 |
| 5,401,300 A * | 3/1995 | Lokhandwala | B01D 53/22 | 95/49 |
| 5,407,466 A * | 4/1995 | Lokhandwala | B01D 53/22 | 423/228 |
| 5,407,467 A * | 4/1995 | Lokhandwala | B01D 53/22 | 95/49 |
| 5,556,449 A * | 9/1996 | Baker | B01D 53/22 | 423/229 |
| 5,558,698 A * | 9/1996 | Baker | B01D 53/22 | 423/229 |
| 6,425,267 B1 * | 7/2002 | Baker | B01D 53/228 | 62/624 |
| 6,565,626 B1 | 5/2003 | Baker et al. | | |
| 6,572,678 B1 * | 6/2003 | Wijmans | B01D 53/226 | 95/47 |
| 6,630,011 B1 * | 10/2003 | Baker | B01D 53/225 | 95/47 |
| 6,648,944 B1 * | 11/2003 | Baker | B01D 53/225 | 95/39 |
| 7,964,020 B2 * | 6/2011 | Baker | B01D 53/22 | 60/274 |
| 9,546,785 B1 * | 1/2017 | Baker | F23J 15/02 | |
| 9,856,769 B2 * | 1/2018 | Baker | F01N 3/0857 | |
| 2002/0124722 A1 * | 9/2002 | Baker | B01D 53/228 | 95/45 |
| 2002/0152889 A1 * | 10/2002 | Baker | B01D 53/228 | 95/45 |
| 2002/0170430 A1 * | 11/2002 | Baker | B01D 53/228 | 95/45 |
| 2011/0005272 A1 * | 1/2011 | Wijmans | B01D 53/225 | 62/617 |
| 2011/0200491 A1 * | 8/2011 | Wijmans | B01D 53/225 | 422/169 |
| 2011/0219777 A1 * | 9/2011 | Wijmans | B01D 53/22 | 60/772 |
| 2011/0219778 A1 * | 9/2011 | Wijmans | B01D 53/22 | 60/772 |
| 2011/0219949 A1 * | 9/2011 | Wijmans | B01D 53/229 | 95/39 |
| 2011/0260112 A1 * | 10/2011 | Wijmans | B01D 53/22 | 252/372 |
| 2012/0272657 A1 * | 11/2012 | Baker | B01D 53/22 | 60/772 |
| 2013/0058853 A1 * | 3/2013 | Baker | B01D 53/22 | 423/228 |

* cited by examiner

APPARATUS AND METHOD FOR SEPARATING CARBON DIOXIDE WITH SELF RECYCLE LOOP

This invention was financially supported by the KOREA CCS2020 Program (NRF-2014M1A8A1049312) supported by the Korea Carbon Capture & Sequestration R&D Center (KCRC), an affiliated organization of the Ministry of Science, ICT and Future Planning, Republic of Korea.

BACKGROUND OF THE INVENTION

1. Field of the Invention

The present invention relates to a device for separating carbon dioxide that includes a self-recycling loop, and to a method of separating carbon dioxide. More particularly, the present invention relates to a device for separating carbon dioxide that includes a self-recycling loop, and to a method of separating carbon dioxide, which serve to effectively separate carbon dioxide from a combustion gas using a separation membrane provided with the self-recycling loop. The device and the method are easily applicable to an industrial process.

2. Description of the Related Art

There has been a lot of research on technology for capturing $CO_2$, which is the main greenhouse gas. $CO_2$-capturing technology may be largely divided into post-combustion, pre-combustion, and oxyfuel combustion technologies. Post-combustion $CO_2$ capturing technology is divided into a chemical absorption method using an amine- or ammonia-based absorbent, a dry absorption method using a solid absorbent instead of a conventional absorption solution, and a membrane separation method using a separation membrane. Although the membrane separation method has an advantage of being an environmentally friendly process, it has a disadvantage in that it is difficult to obtain high-purity carbon dioxide.

The gas separation method disclosed in U.S. Pat. No. 4,264,338 is characterized in that, during a multi-stage separation membrane process, the unreacted residue gas of a second or third stage is recycled to flow to the feed side of a first stage, thereby increasing the capturing amount (recovery rate) of the separation membrane of the first stage. However, the gas separation method of U.S. Pat. No. 4,264,338 is limited as to the extent to which the carbon dioxide separation performance of the system can be increased because residue gas having a low concentration of carbon dioxide is recycled and used.

SUMMARY OF THE INVENTION

Accordingly, the present invention has been made keeping in mind the above problems occurring in the related art, and an object of the present invention is to provide a device for separating high-purity carbon dioxide including a self-recycling loop, and a method of separating high-purity carbon dioxide.

In order to accomplish the above object, the present invention provides a device for separating carbon dioxide, the device including a first separation membrane into which a combustion gas is fed, and a second separation membrane into which a permeate gas of the first separation membrane is fed. The second separation membrane is provided with a self-recycling loop, in which a permeate gas of the second separation membrane does not pass through a separation membrane other than the second separation membrane but is fed back into the second separation membrane.

The device may further include a third separation membrane into which a residue gas of the first separation membrane is fed.

The third separation membrane may be provided with a self-recycling loop, in which a permeate gas of the third separation membrane does not pass through a separation membrane other than the third separation membrane but is fed back into the third separation membrane.

Each of the first separation membrane and the second separation membrane may be provided with a feed side through which the gas is fed.

The feed side may include a pressurizing means.

A permeate side of at least one of the first and second separation membranes may include a decompressing means.

In a method of separating carbon dioxide, the pressure ratio of a permeate side to a feed side may be set to 1.0 to 3.0:0.1 to 0.5 (bar,a) in the first separation membrane, the pressure ratio of a permeate side to a feed side may be set to 1.0 to 3.0:0.03 to 0.5 (bar,a) in the second separation membrane, and an area ratio of the first separation membrane to the second separation membrane may be set to 1:1 to 3:1. Here, the unit "(bar,a)" refers to absolute pressure. More preferably, the pressure ratio of the permeate side to the feed side may be set to 1.3:0.14 (bar,a) in the first separation membrane, the pressure ratio of the permeate side to the feed side may be set to 1.3:0.05 (bar,a) in the second separation membrane, and the area ratio of the first separation membrane to the second separation membrane may be set to 3:1.

In order to accomplish the above object, the present invention also provides a device for separating carbon dioxide including first and second separation membranes. The device includes a first line through which a combustion gas is fed into a feed side of the first separation membrane, a second line through which a residue gas of the first separation membrane is discharged, a third line through which a permeate gas of the first separation membrane is fed into a feed side of the second separation membrane, a fourth line through which a residue gas of the second separation membrane is fed into the feed side of the first separation membrane, and a fifth line through which a permeate gas of the second separation membrane is fed back into the feed side of the second separation membrane while the permeate gas does not pass through a separation membrane other than the second separation membrane.

In order to accomplish the above object, the present invention also provides a method of separating carbon dioxide, the method including feeding a combustion gas into a first separation membrane to obtain a first permeate gas and a first residue gas, discharging the first residue gas, and feeding the first permeate gas into a second separation membrane (step a), and introducing a second residue gas of the gas, which is fed into the second separation membrane, into the first separation membrane, and feeding a second permeate gas back into the second separation membrane while the second permeate gas does not pass through a separation membrane other than the second separation membrane, thereby recycling the second permeate gas passing through a permeate side of the second separation membrane (step b).

In the method of separating carbon dioxide, the pressure ratio of a permeate side to a feed side may be set to 1.0 to 3.0:0.1 to 0.5 (bar,a) in the first separation membrane, the pressure ratio of a permeate side to a feed side may be set to 1.0 to 3.0:0.03 to 0.5 (bar,a) in the second separation membrane, and the area ratio of the first separation membrane to the second separation membrane may be set to 1:1 to 3:1. More preferably, the pressure ratio of the permeate side to the feed side may be set to 1.3:0.14 in the first separation membrane, the pressure ratio of the permeate side to the feed side may be set to 1.3:0.05 (bar,a) in the second separation membrane, and the area ratio of the first separation membrane to the second separation membrane may be set to 3:1.

The present invention adopts a self-recycling loop in which a permeate gas passing through a specific separation membrane is introduced back into the specific separation membrane while a residue gas passing through the specific separation membrane is introduced into another separation membrane. Accordingly, the concentration of carbon dioxide in the feed gas of the specific separation membrane is increased, which increases the concentration of the permeate gas to thus improve the separation performance of the separation membrane, thereby separating high-purity carbon dioxide.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Hereinafter, the present invention will be described in greater detail through drawings and embodiments. The objects, features and advantages of the present invention will be readily understood through the following drawings and embodiments. The present invention is not limited to the embodiments described herein, but may be embodied in other forms. It is to be understood that the embodiments described herein are intended to provide sufficient explanation of the present invention to those who are skilled in the art. Therefore, the present invention should not be limited by the following embodiments.

In the present specification, "self-recycling" means that a permeate gas of a specific separation membrane does not pass through a separation means including another separation membrane, but is fed back into the feed side of the specific separation membrane itself. Further, "feed gas" means a gas fed into the feed side of a specific separation membrane, and "permeate gas" means a gas that is discharged by passing through the specific separation membrane. "Residue gas" means a gas that is discharged without passing through a permeate side of a separation membrane.

Figure 1:
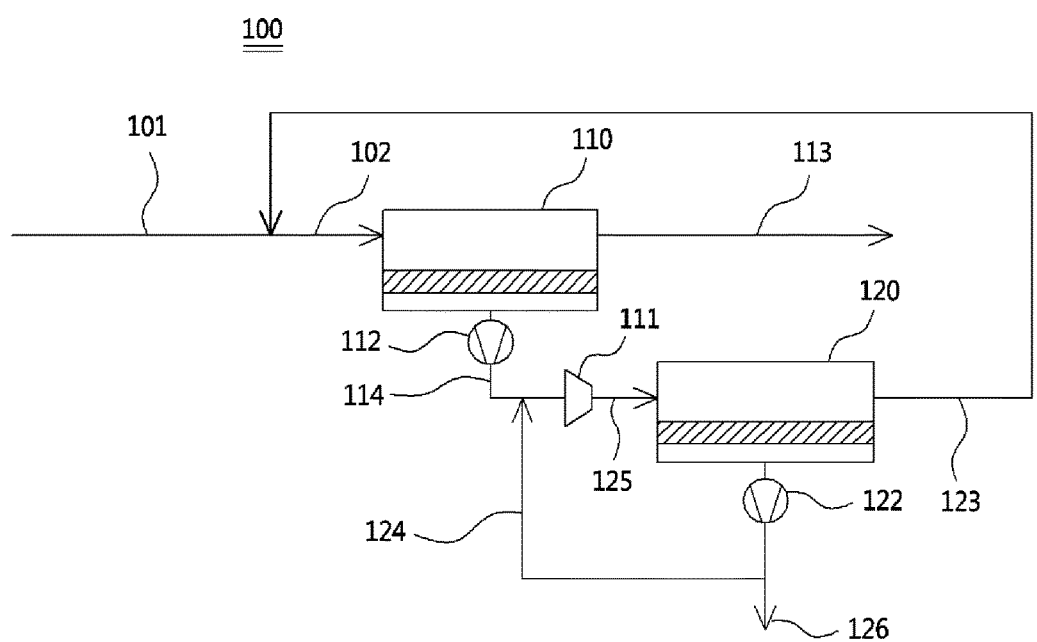
FIGS. 1 and 2 are schematic views showing a device for separating carbon dioxide according to an Example of the present invention.

FIG. 1 is a view showing the constitution of a device 100 for separating carbon dioxide according to Example 1 of the present invention. As shown in the drawing, the device 100 for separating carbon dioxide includes two separation membranes 110 and 120. The feed side of the separation membranes 110 and 120 may include a pressurizing means 111 for increasing the pressure of the feed side. The pressurizing means 111 may be a means for increasing the pressure of the gas, such as a compressor, a blower, and a turbo blower. The permeate side may include a decompressing means 112 and 122 for reducing the pressure of the permeate side. The decompressing means 122 may be a means for reducing the pressure of the gas, such as a vacuum pump and a fan. Generally, the cost of operating the separation membrane process is increased as the driving ratio of the pressurizing means and the decompressing means is increased. Accordingly, the cost of operating the separation membrane process, that is, the cost of capturing carbon dioxide, is increased as the pressure ratio of the feed side and the permeate side of each separation membrane is increased. A self-recycling loop according to the Example of the present invention has a merit in that a permeate side purity is greatly improved even when the pressure ratio is not changed, thus ensuring high capturing efficiency while maintaining same operating costs. The pressurizing means and the decompressing means are not essential constitutional elements, and accordingly, may be removed depending on the pressure conditions.

The combustion gas discharged from a boiler or the like is fed through lines 101 and 102 into a first separation membrane 110. Carbon dioxide in the combustion gas fed into the first separation membrane 110 flows through the separation membrane to the permeate side. The residue gas, which does not flow through the separation membrane to the permeate side, is discharged through a line 113. The permeate gas of the first separation membrane 110 is fed through lines 114 and 125 into the second separation membrane 120. The residue gas, which does not flow through the second separation membrane 120 to the permeate side, is fed into the first separation membrane 110 through lines 123 and 102. Since the second separation membrane is provided with the self-recycling loop, the permeate gas that is discharged by passing through the second separation membrane does not flow through a separation membrane other than the second separation membrane but is fed back into the second separation membrane through a line 124. The permeate gas passing again through the second separation membrane is recycled into a device for collecting carbon dioxide (not shown). As described above, the device for separating carbon dioxide according to an Example of the present invention adopts a self-recycling loop in which the permeate gas passing through a specific separation membrane is introduced back into the specific separation membrane while the residue gas of the specific separation membrane is introduced into another separation membrane. Since the self-recycling loop is applied to the Example of the present invention, the concentration of carbon dioxide in the feed side of the specific separation membrane may be increased, which increases the concentration of the permeate gas to thus improve the separation efficiency of carbon dioxide, thereby improving the purity of the carbon dioxide that is separated.

Figure 2:
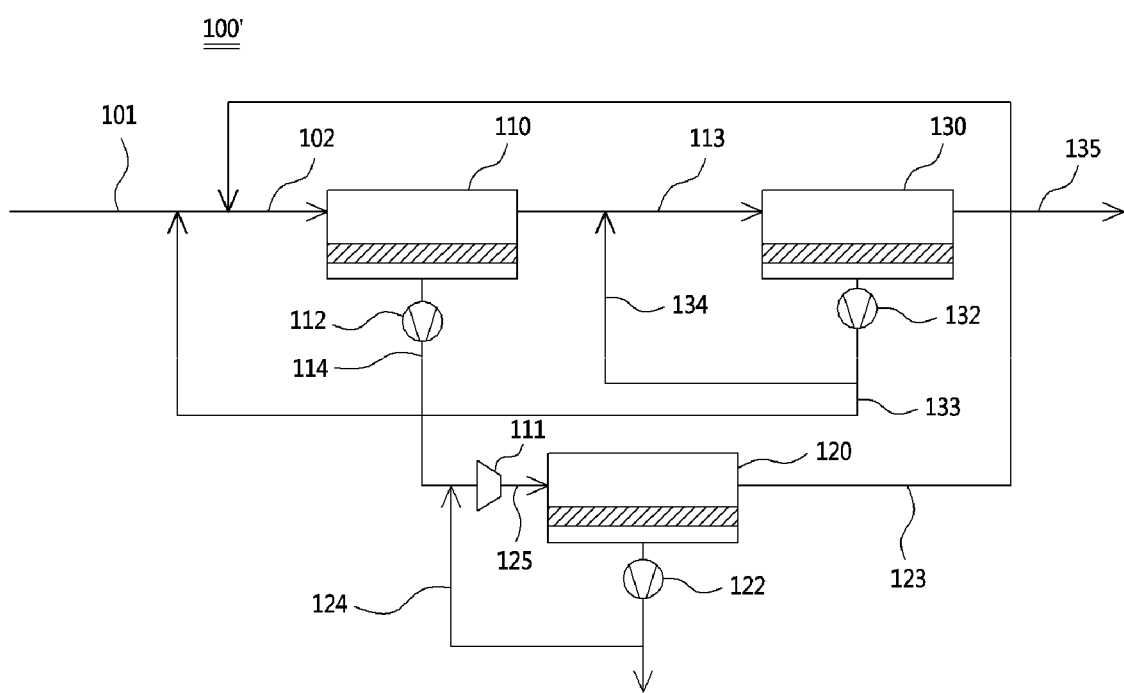

Further, referring to FIG. 2, a device 100' for separating carbon dioxide may further include a third separation membrane 130. When the third separation membrane 130 is further included, the residue gas of the first separation membrane 110 is fed into the third separation membrane 130 through the line 113. The residue gas that does not flow through the third separation membrane 130 to the permeate side is discharged through a line 135. The permeate gas of the third separation membrane is divided, and a portion thereof is fed back into the third separation membrane provided with a self-recycling loop 134. Accordingly, the concentration of carbon dioxide in the feed gas of the third separation membrane 130 may be increased, which increases the concentration of the permeate gas, thereby improving the separation performance of the third separation membrane 130.

Figure 3:
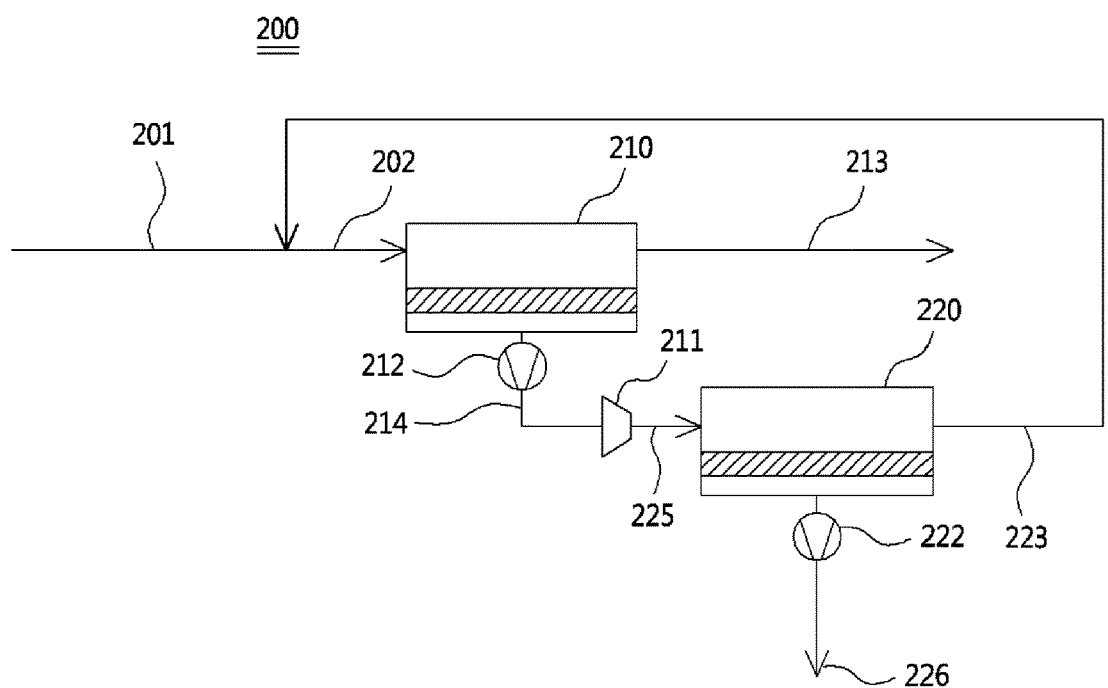
FIG. 3 is a schematic view showing a device for separating carbon dioxide according to a Comparative Example.

Experimental Example 1: Analysis of Performance of Device for Separating Carbon Dioxide A device for separating carbon dioxide including a self-recycling loop (Example, FIG. 1) and a device for separating carbon dioxide not including a self-recycling loop (Comparative Example, FIG. 3) were analyzed to determine the separation performance of carbon dioxide, and the results are set forth in Table 1. In the present experiment, the same separation membrane was used in the Example (FIG. 1) and the Comparative Example (FIG. 3). The Example and the Comparative Example were the same as each other in terms of pressure, flow rate, and other conditions. In other words, the experimental procedures were the same, except that the self-recycling loop was used in the Example but not in the Comparative Example (feed: composition $CO_2/N_2$ of 14/86 (%/%), a flow rate of 4 LPM, and a pressure of 1.2 bar).

TABLE 1

| Example (self-recycling O) | (101) | (113) | (125) | (126) | Carbon Dioxide Purity [%] |
|---|---|---|---|---|---|
| FIG. 1 (100) | 14.0 | 6.50 | 72.97 | 88.85 | 88.85 |
| Comparative Example (self-recycling X) | (201) | (213) | (225) | (226) | Carbon Dioxide Purity [%] |
| FIG. 3 (200) | 14.0 | 7.71 | 54.76 | 69.00 | 69.00 |

The same experimental procedure was repeated to analyze the performance of the device for separating carbon dioxide, except that only the flow rate of the feed was changed to 2 LPM. The results are set forth in Table 2.

TABLE 2

| Example (self-recycling O) | (101) | (113) | (125) | (126) | Carbon Dioxide Purity [%] |
|---|---|---|---|---|---|
| FIG. 1 (100) | 14.0 | 3.5 | 71.43 | 89.53 | 89.53 |
| Comparative Example (self-recycling X) | (201) | (213) | (225) | (226) | Carbon Dioxide Purity [%] |
| FIG. 3 (200) | 14.0 | 0.48 | 57.17 | 56.54 | 56.54 |

Figure 4A:
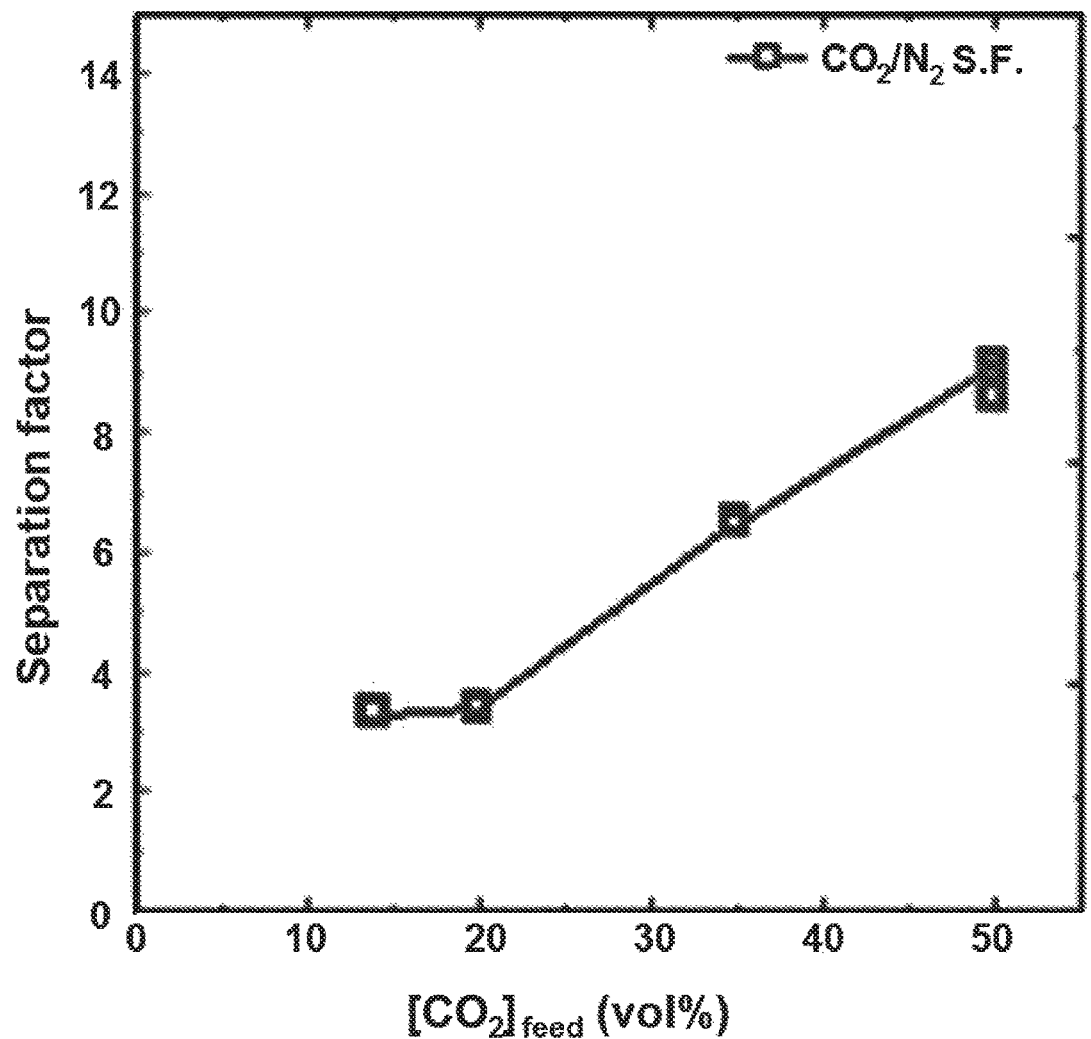
FIG. 4A is a graph showing a separation factor as a function of the concentration of carbon dioxide during a single separation membrane process.
Figure 4B:
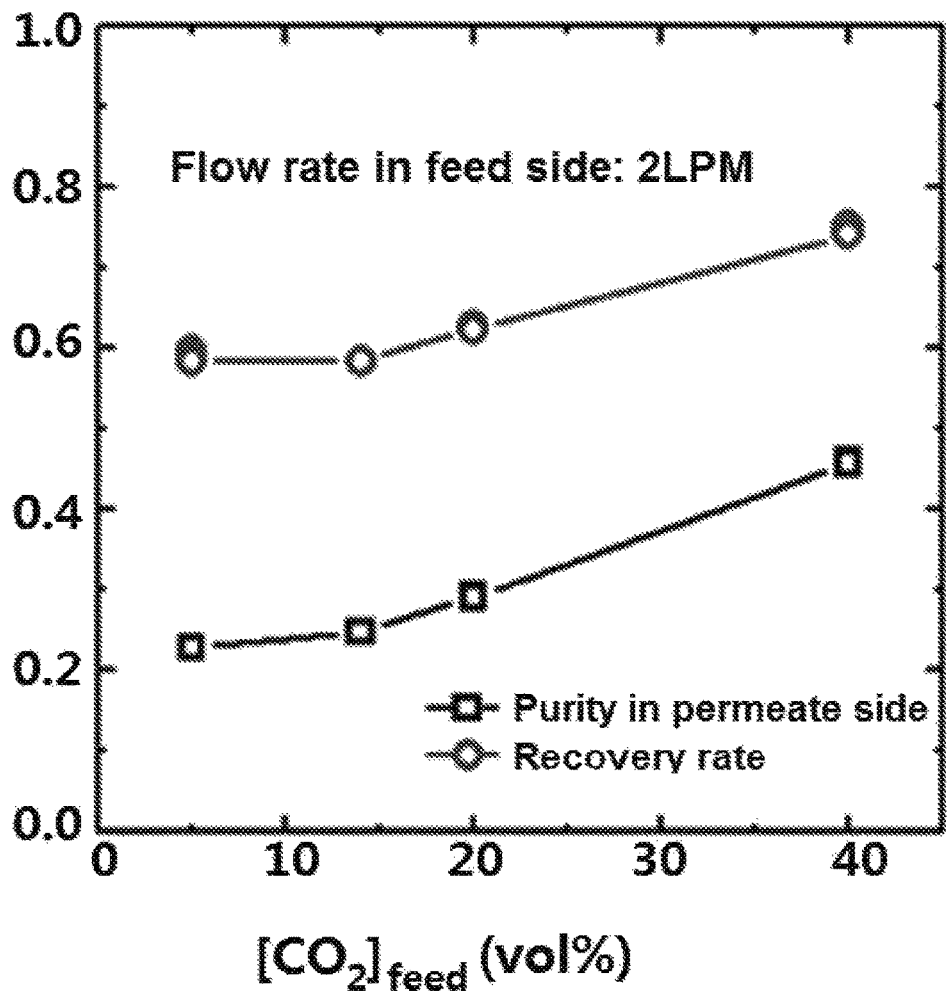
FIG. 4B is a graph showing a permeate side purity and a recovery rate, depending on a feed side composition, during the single separation membrane process.

From the results of the analysis, it was confirmed that when the self-recycling loop was applied to the separation membrane provided in the device for separating carbon dioxide, the purity of the recycled carbon dioxide was improved by 20% or more. The purpose of capturing carbon dioxide from the combustion gas is to separate high-purity carbon dioxide from the combustion exhaustion gas, to liquefy the high-purity carbon dioxide, and to store and reuse the liquefied high-purity carbon dioxide. Since carbon dioxide can be liquefied using even a small amount of energy when the purity of carbon dioxide is high, it is important to obtain the high-purity carbon dioxide in the permeate side of the final separation membrane. According to the Example of the present invention, from the experiment, it was confirmed that the high-purity carbon dioxide was recycled for both flow rates, namely 4 LPM and 2 LPM. Accordingly, it can be considered that the present invention is a technology that is very useful for separating carbon dioxide. This result is based on the fact that the concentration of carbon dioxide in the feed gas of the corresponding separation membrane is increased when the self-recycling loop is used. From the above-described experiment, it was confirmed that, in the case where the separation device according to the Example of the present invention was applied, when the flow rate of the feed was set to 4 LPM, the concentration of carbon dioxide in the feed gas of the second separation membrane was improved from 54.76% (225) to 72.97% (125), and that when the flow rate of the feed was set to 2 LPM, the concentration of carbon dioxide in the feed gas of the second separation membrane was improved from 57.17% (225) to 71.43% (125). Typically, in view of the performance of the single separation membrane, the separation efficiency of the separation membrane is improved when the concentration in the feed side is increased (FIGS. 4A and 4B). Accordingly, when the self-recycling loop is used, the concentration in the feed side of the corresponding separation membrane may be increased, which greatly increases the concentration of the final permeate gas, thereby improving the purity of the gas that is recycled.

The purpose of capturing the high-purity carbon dioxide from the combustion gas is to liquefy carbon dioxide and to store and reuse the liquefied carbon dioxide. Since carbon dioxide can be liquefied using even a small amount of energy when the purity of carbon dioxide is high, it can be considered that obtaining the high-purity carbon dioxide in the permeate side of the final separation membrane corresponds to an inventive effect of the present invention.

If the material of the separation membrane is fixed, in order to obtain high purity or a high recovery rate during a separation membrane process, the difference in the pressure of the feed side and the permeate side may be increased, which serves to improve the purity and the recovery rate. However, high energy and maintenance costs are required to drive a pressurizing means (a compressor) or a decompressing means (a vacuum pump) so as to increase the pressure of the feed side or to reduce the pressure of the permeate side. Accordingly, separation costs are increased. However, in the case where the self-recycling loop process according to the present invention is used, the purity and the recovery rate may be increased in the final permeate side even when operating conditions such as the pressure difference are not changed. This is based on the fact that the concentration of carbon dioxide in the feed side of the corresponding separation membrane (120 of FIG. 1 or 2) is increased when the self-recycling loop is used.

FIG. 4B shows the performance of the separation membrane and the purity in the permeate side of the separation membrane, depending on the concentration in the feed side, during a single separation membrane process using only one separation membrane, unlike FIG. 1, which shows the use of the two separation membranes. It can be confirmed that the higher the concentration of carbon dioxide in the feed side, the higher the purity and the recovery rate in the permeate side, even when the flow rate in the feed side is not changed.

Meanwhile, in the case of the single separation membrane process, the purity is less than 30% and the recovery rate is less than 60% in the permeate side when a general combustion flue gas having a carbon dioxide composition of 5 to 15% is fed. Accordingly, it is impossible to realize the purity (80%) and the recovery rate (80%) required to perform liquefaction. Further, from the data of the Comparative Example, it can be seen that it is impossible to sufficiently increase the purity and the recovery rate in the permeate side using a well-known two-stage membrane process under operating conditions, such as a pressure and a flow rate, having a limited range of driving energy. However, in the case where the self-recycling loop is applied to the second separation membrane during the two-stage membrane process, as in the Example of the present invention, the purity and the recovery rate in the permeate side may be improved even when the operating conditions (the pressure or the flow rate) are not changed. Accordingly, the purity and the recovery rate in the permeate side may be further increased when the operation energy is fixed. Therefore, based on the above-described principle, the purity and the recovery rate of the gas of the permeate side may be improved using the self-recycling loop as a means for increasing the purity in the feed side of the separation membrane.

Experimental Example 2: Optimization of Operation Variables of Device for Separating Carbon Dioxide Including Self-Recycling Loop The performance of the device for separating carbon dioxide was analyzed with respect to the operation variables described in the following Table 3, thereby optimizing the operation variables of the device (FIG. 1) for separating carbon dioxide according to the Example of the present invention.

TABLE 3

| | Flow rate (Nm³/h) | M1 Pressure ratio of feed side/ permeate side (bar, a/bar, a) | M2 Pressure ratio of feed side/ permeate side (bar, a/bar, a) | Area ratio (first separation membrane:second separation membrane) | $CO_2$ Purity % | Recovery of $CO_2$ % |
|---|---|---|---|---|---|---|
| Case 1 | 0.5 | 1/0.1 | 1/0.01 | 3:1 | 76 | 48 |
| Case 2 | 0.5 | 1/0.14 | 1/0.05 | 3:1 | 89 | 28 |
| Case 3 | 0.24 | 1.3/0.1 | 1/0.03 | 2:1 | 69 | 31 |
| Case 4 | 0.12 | 1.3/0.1 | 1.3/0.01 | 2:1 | 69 | 60 |
| Case 5 | 0.24 | 1.3/0.1 | 1.3/0.05 | 3:1 | 89 | 56 |
| Case 6 | 0.12 | 1.3/0.14 | 1.3/0.05 | 3:1 | 90 | 86 |

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A device for separating carbon dioxide, the device comprising:
    a first separation membrane into which a combustion gas is fed;
    a second separation membrane into which a permeate gas of the first separation membrane is fed; and
    a third separation membrane into which a residue gas of the first separation membrane is fed,
    wherein the second separation membrane is provided with a self-recycling loop in which a portion of a permeate gas of the second separation membrane does not pass through a separation membrane other than the second separation membrane but is fed back into the second separation membrane, and
    wherein the third separation membrane is provided with a self-recycling loop in which a portion of a permeate gas of the third separation membrane does not pass through a separation membrane other than the third separation membrane, but the portion of the permeate gas of the third separation membrane is fed back into the third separation membrane.

2. The device of claim 1, wherein the first separation membrane is provided with a feed side through which the combustion gas is fed and the second separation membrane is provided with a feed side through which the permeate gas of the first separation membrane is fed.

3. The device of claim 2, further comprising a pressurizing means on the feed side.

4. The device of claim 1, further comprising a decompressing means on a permeate side of at least one of the first and second separation membranes.

5. The device of claim 1, wherein the first separation membrane has a pressure of 1.0~3.0(bar, a) in a feed side and a pressure of 0.1~0.5(bar, a) in a permeate side, the second separation membrane has a pressure of 1.0~3.0(bar, a) in a feed side and a pressure of 0.03~0.5(bar, a) in a permeate side, and the first and second separation membranes have an area ratio of the first separation membrane to the second separation membrane ranging from 1:1 to 3:1.

6. The device of claim 1, wherein the remaining portion of the permeate gas of the third separation membrane is fed back into the first separation membrane.

7. A method of separating carbon dioxide, the method comprising steps of:
    (a) feeding a combustion gas into a first separation membrane to obtain a first permeate gas and a first residue gas, discharging the first residue gas from the first separation membrane, and feeding the first permeate gas into a second separation membrane;
    (b) feeding a second residue gas from the second separation membrane into the first separation membrane, and feeding a portion of a second permeate gas from the second separation membrane directly back into the second separation membrane while the portion of the second permeate gas does not pass through a separation membrane other than the second separation membrane to increase a concentration of carbon dioxide in a feed side of the second separation membrane, thereby recycling the second permeate gas that is discharged by passing through a permeate side of the second separation membrane; and
    (c) feeding the first residue gas from the first separation membrane into a third separation membrane to obtain a third permeate gas and a third residue gas, discharging the third residue gas from the third separation membrane, and feeding a portion of the third permeate gas back into the third separation membrane while the portion of the third permeate gas does not pass through a separation membrane other than the third separation membrane.

8. The method of claim 7, wherein the remaining portion of the third permeate gas of the third separation membrane is fed back into the first separation membrane.

* * * * *